Patented Sept. 26, 1944

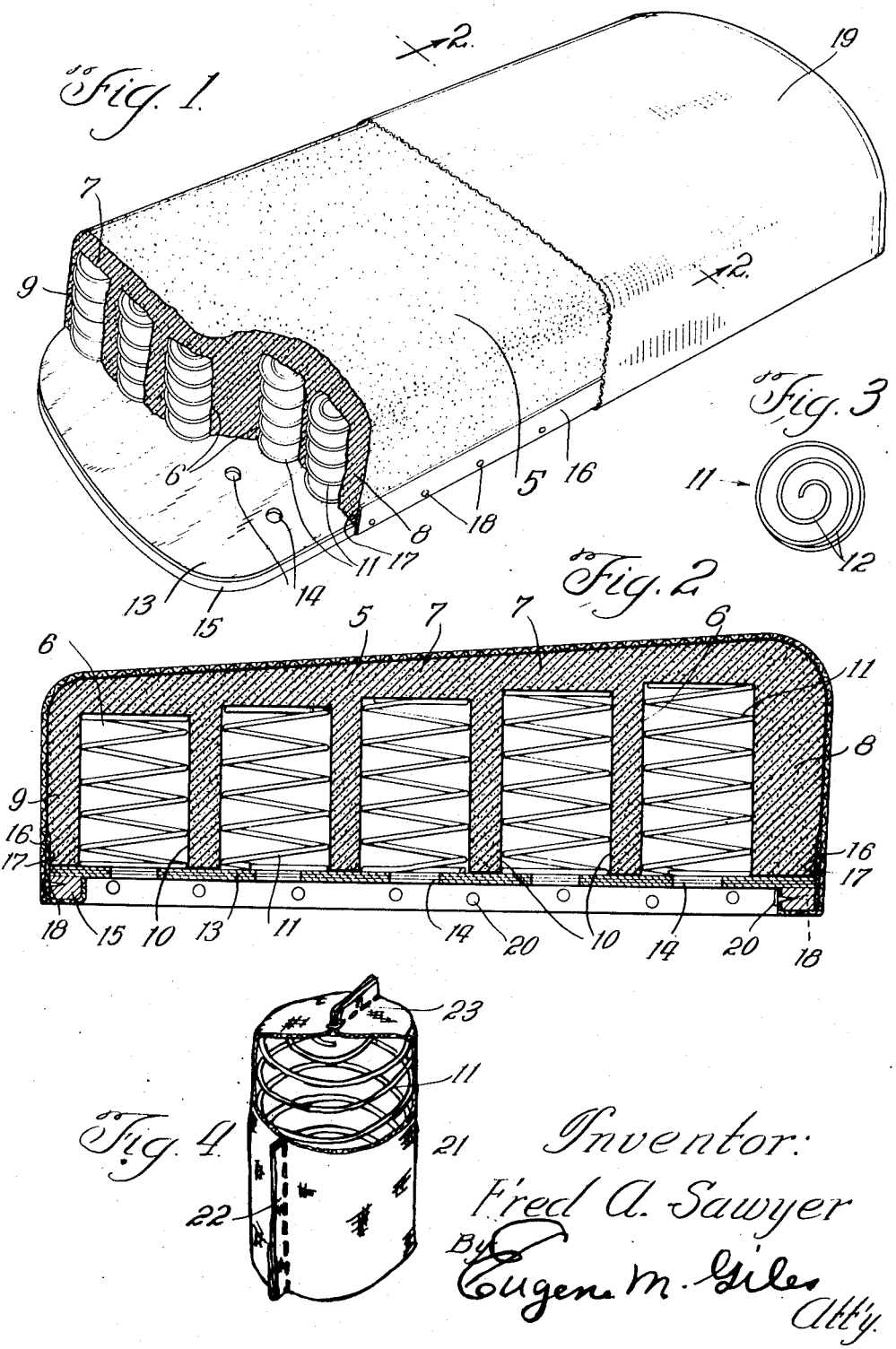

2,359,003

UNITED STATES PATENT OFFICE 2,359,003

SPRING INSERT CUSHION

Fred A. Sawyer, South Bend, Ind., assignor to Mishawaka Rubber and Woolen Manufacturing Company, Mishawaka, Ind., a corporation of Indiana Application November 28, 1940, Serial No. 367,489

4 Claims. (Cl. 155—179)

My invention relates to cushions of spongy rubber material, for example, molded cushions of latex foam such as now commonly used, and has reference more particularly to the incorporation therein of coil springs in a readily removable manner whereby compressibility of the cushion as a whole or of selected areas thereof may be regulated.

In the manufacture of spongy rubber cushions for seating and similar purposes, some are required to be more compressible than others and even in the same cushion it is oftentimes desirable that certain areas thereof be of different compressibility than other areas. Such cushions are commonly made with cored out openings extending upwardly therein from the bottom and difference in compressibility may be obtained by varying the size or spacing of the core openings or by varying the density of the spongy rubber or latex foam or by varying the depth or thickness of the cushion.

On account of the cost and delay in changing the molds, it is oftentimes impracticable to provide the required core size or spacing or depth of cushion for a desired or preferred compressibility, or the permissible depth of cushion may not be sufficient to obtain the desired compressibility with an available core size or spacing. Moreover, it is inconvenient and wasteful of time and material to make up separate batches of latex foam for the different densities that may be required to provide various cushions with proper cushion compressibility and quite difficult to provide differential compressibility of certain areas of the same cushion in this manner.

Furthermore, cost is an important factor in the saleability of spongy rubber cushions and on this account it not only is important to utilize a cushion construction which will minimize the amount of spongy rubber material necessary to obtain the desired cushioning characteristics and avoid unnecessary increase in cushion volume or density of the spongy rubber, but it is also important to minimize incidental expense of mold changes or the like or any special construction that is not readily and economically applicable to a standardized form of cushion.

The principal objects of my invention are to simplify the construction of spongy rubber cushions; to minimize the cost thereof without impairment of the desirable spongy rubber cushioning characteristics; to permit convenient and economical regulation of the compressibility of the cushion or selected areas thereof; and to control compressibility without imposing any undesirable or detrimental strains or restrictions on the spongy rubber mass, these and other objects being accomplished as pointed out hereinafter and as shown in the accompanying drawing in which;

Fig. 1 is a perspective view of an assembled spongy rubber cushion constructed in accordance with my invention, parts thereof being broken away and shown in section to disclose details of the construction;

Fig. 2 is an enlarged sectional view taken on the line 2—2 of Fig. 1;

Fig. 3 is a top view of one of the springs; and

Fig. 4 is a vertical sectional view of a fabric enclosed spring.

The cushion structure shown in the drawing is of a form suitable for use as a seat cushion in automobiles or the like, although it is to be understood that this is merely illustrative and that the invention may be used in other cushion structures. In this illustrated cushion structure, the reference numeral 5 indicates the cushion body which is of spongy rubber material, molded in the cushion form with cored out cylindrical openings 6 throughout the area thereof extending upwardly in spaced parallel relation from the bottom of the cushion nearly to the top, leaving a substantial thickness of the spongy rubber over the tops of the openings 6 as indicated at 7 as well as a substantial thickness of the spongy rubber extending around the cored out area, the front portion thereof being indicated at 8 and the rear portion at 9, and it will be understood that somewhat similar portions extend across the cushion ends.

The cushion body 5 may, of course, be built up, for example, by utilizing a core portion containing the openings 6 and cementing slabs of the spongy rubber onto the top, to close the core openings, and around the core body at the front, rear and ends, this built up form being advantageous in making cushions when the quantity required is not sufficient to justify the expense of a mold, although it is generally preferable to form the cushion body 5 as an integral molded unit.

Such cushions are commonly made of latex foam which is shaped and cured in molds of cushion shape and in the molding of the core openings 6 a skin 10 is formed which lines and reinforces the openings. These openings or cavities 6 are quite large, as for example, about four inches in diameter and the intervening walls comparatively thin, for example, approximately one-half inch, so as to minimize the volume of spongy rubber required, and within each opening or cavity 6 is inserted a light cylindrical coil spring 11 of a diameter to lightly engage the surrounding cavity wall, the upper end of each spring being preferably formed with a flat spiral top 12 of the spring wire which is resiliently engaged against and supports the top wall 7 of the respective opening 6.

The cushion body with its inserted springs 11 is preferably supported on a flat deck 13 which closes the lower ends of the cavities 6 and supports the springs 11, a small vent opening 14 preferably being provided through the deck 13 under each cavity 6, and the cushion body is attached to this deck 13 to form a cushion unit assembly. This deck 13 may be of plywood cut to shape to correspond to the contour of the cushion bottom and provided with a marginal reinforcing strip 15 on the under side which serves also as a tacking strip, and the cushion body 5 preferably has a mounting tape 16 securely cemented thereto around the bottom as at 17 so that the lower portion of this tape strip extends below the cushion and this lower projecting portion of the tape 16 is drawn down against the outer side of the reinforcing strip 15 and tacked thereto, as indicated at 18, at suitable intervals around the cushion to hold the cushion body 5 firmly in place on the deck 13. A covering 19 of upholstery material shaped to conform to the cushion is applied thereon and secured in place by tacking the lower margins thereof to the tacking strip 15 as at 20 and it will be understood that these lower margins may be turned under the strip 15 and tacked to the inner side thereof as shown, or they may be tacked to the bottom or outer face of the strip 15 as preferred.

Preferably the springs 11 are normally slightly longer than the cavities 6 so that they are under slight compression when inserted in the cavities 6 of the cushion body and the latter secured to the deck 13 and it will be noted that each spring is independent and has no connection with the other springs nor any attachment to the deck 13 so that each spring is free to adjust itself to the particular location as dictated by the location and position of the particular cavity in which it is inserted. There is accordingly no strain imposed by the springs on the spongy rubber mass and the cushion has greater freedom to respond to compressive strains than it would if the springs were connected to one another or attached to the base. Moreover this independence of the springs contributes greatly to economy of construction, permits convenient replacement of part or all of the springs and also regulation of cushion compressibility as springs of any desired resistance may be employed throughout the cushion or springs may be employed in some cavities 6 of a resistance different than that of the springs in other cavities so that any desired compressiveness of the cushion as a whole may readily be obtained as well as greater or less compressibility of selected areas of the cushion if desired. Moreover, quiet operation is assured as each spring is housed in rubber and has no metal connections that might rub against one another.

It is to be understood, of course, that the individual springs impose only a light resistance to compression, and objectionable rebound is avoided by the dampening effect of the spongy rubber and also the closure of the lower ends of the cavities 6 against the deck 13 which forms air pockets in these cavities to and from which air movement is retarded by the small size of the vent openings 14 and slowness of air flow through the cavity walls.

If desired each spring 11 may be enclosed in a fabric covering 21 before inserting in the cavity 6, this covering being sewed along the side as at 22 or otherwise made in cylindrical form corresponding to that of the spring, and sewed as at 23 or otherwise closed at the ends to completely cover the spring, and this cylindrical covering being preferably of the same length as the cavity 6 in which the fabric covered spring is to be inserted. With this construction a buffer material is provided between the spring wire and the spongy rubber to protect the latter against any detrimental effect of the spring movements. Moreover springs of greater length than the cavities may be compressed in the fabric container to the same length as the cavities and when the cushion body containing these fabric enclosed springs is placed on the deck 13 it will rest solidly thereon without any lifting tendency on the part of the springs.

While the cavities 6 and their springs 11 are shown herein in a vertical position or perpendicular to the deck 13 it is to be understood that they may be disposed otherwise than vertical or at any desired angle to the deck 13.

Among the advantages of the present invention is its adaptability to custom construction. By removing the springs in any portion of the cushion and replacing them with lighter or heavier springs, or by using longer or shorter springs or even by omitting one or a number of the springs, the cushion is capable of infinite degrees of adjustment of compressibility to suit any individual's or purchaser's requirements. Ample cushioning can be obtained with minimum depth of cushion and without bottoming and great economy of material is effected without sacrifice of desired cushioning characteristics and in a construction of such simplicity that manufacture is greatly facilitated.

While I have shown and described my invention in a preferred form, I am aware that various changes and modifications may be made therein without departing from the principles of my invention, the scope of which is to be determined from the following claims.

I claim as my invention:

1. In a cushion of the class described, the combination of a cushion body of spongy rubber having a plurality of cavities therein opening through the bottom of the cushion body; a supporting base upon which the cushion body is supported, a plurality of coil springs individually mounted in and individually removable from said cavities, at least some of said springs being of greater normal height than the respective cavity, and a fabric jacket enclosing each of said springs and holding the same under compression within a length corresponding substantially to the length of their respective cavities, each fabric jacket being removably contained in a cavity of the cushion body.

2. In a cushion of the class described, the combination of a cushion body of spongy rubber having a plurality of cavities therein opening through the bottom of the cushion body; and a spring unit removably mounted in each of said cavities and comprising a coil spring and a fabric jacket enclosing the same, and a supporting base upon which the cushion body is supported and against which the fabric enclosed lower ends of the springs are seated, each spring having a flat spiral top.

3. In a cushion of the class described, the combination of a cushion body of spongy rubber having a plurality of cavities therein opening through the bottom of the cushion body; a supporting base upon which the cushion body is supported, a plurality of coil spring units individually mounted in and individually removable from said cavities, each of said spring units comprising a coil spring and an enclosing fabric jacket therefor removable with the spring and each spring having a flat spiral top.

4. In a cushion of the class described, the combination of a cushion body of spongy rubber having a plurality of upright cavities therein opening through the bottom of the cushion body, a supporting base upon which the cushion body is supported and to which the cushion body is marginally fastened, a plurality of independent coil springs each removably occupying a separate cavity of the cushion body and individually retained therein by engagement with the supporting base, and a fabric jacket enclosing each of said springs and removable from said cavities therewith.

FRED A. SAWYER.